United States Patent [19]

Kida et al.

[11] Patent Number: 4,979,103

[45] Date of Patent: Dec. 18, 1990

[54] DATA PROCESSING METHOD AND APPARATUS HAVING PLURAL BUS INTERFACES

[75] Inventors: Hiroyuki Kida; Tooru Komagawa; Hideo Maejima, all of Hitachi, Japan

[73] Assignee: Hitachi, Ltd., Tokyo, Japan

[21] Appl. No.: 176,234

[22] Filed: Mar. 31, 1988

[30] Foreign Application Priority Data

Mar. 31, 1987 [JP] Japan .................................. 62-78198

[51] Int. Cl.[5] .............................................. G06F 3/00
[52] U.S. Cl. .................................... 364/200; 364/243; 364/244; 364/244.3; 364/244.6; 364/238.4; 364/232.8
[58] Field of Search ... 364/200 MS File, 900 MS File

[56] References Cited

U.S. PATENT DOCUMENTS

| | | | |
|---|---|---|---|
| 4,307,447 | 12/1981 | Provanzano et al. | 364/200 |
| 4,371,928 | 2/1983 | Barlow et al. | 364/200 |
| 4,371,947 | 2/1983 | Fujisawa | 364/900 |
| 4,486,827 | 12/1984 | Shima et al. | 364/200 |
| 4,564,889 | 1/1986 | Holly et al. | 364/200 |
| 4,612,613 | 9/1986 | Gershenson et al. | 364/200 |
| 4,638,451 | 1/1987 | Hester et al. | 364/900 |
| 4,646,232 | 2/1987 | Chang et al. | 364/200 |

OTHER PUBLICATIONS

"Microprocessors", *IEEE Spectrum*, Jan. 1985, pp. 53-55.

*Primary Examiner*—Raulfe B. Zache
*Attorney, Agent, or Firm*—Antonelli, Terry, Stout & Kraus

[57] ABSTRACT

A method and apparatus for controlling a plurality of bus interfaces in a system including on one chip a central processing unit and an internal memory. A first operand retrieving operation is executed by a first operand retrieving unit when one operand is discriminated that is located outside a chip, and a second operand retrieving operation is executed by a second operand retrieving unit when another operand is discriminated that is located inside the chip, so that the operand is read to the central processing unit in accordance with the bus interface signals of the first and the second operand retrieving units.

8 Claims, 4 Drawing Sheets

DATA PROCESSING METHOD AND APPARATUS HAVING PLURAL BUS INTERFACES

FIELD OF THE INVENTION

The present invention relates to a data processing method and apparatus for processing an operand and more particularly, to a data processing method and apparatus which are provided with a central processing unit for processing an operand corresponding to an instruction and a memory for storing the operand, both being included on the same chip.

BACKGROUND OF THE INVENTION

Recently, a technique concerning the use of MOS (Metal Oxide Semiconductor) technology applied to a microcomputer has progressed remarkably, and integrated circuits are being produced with a high integration ratio so that a microcomputer having a high performance and high function is now actuating available. There has been introduced a processor for such a microcomputer as described, for instance, in the second to 4th paragraphs on page 55 of "Microprocessors" in IEEE Spectrum, published in Jan., 1985. The prior art discloses that the central processing unit for processing an operand corresponding to an instruction and a memory unit for storing the operand are mounted on the same chip. By providing a microprocessor and a memory on the same chip, the signal delay of a signal line connecting the microprocessor and the memory can be reduced significantly. And further, by providing the microprocessor and the memory on the same chip, when the microprocessor accesses the memory for fetching a program or processing an operand, the transmission timing, the access time of the control signal or the data which is received and transmitted between the memory and the microprocessor is reduced. By enlarging the data bus width or forming the memory and the microprocessor on the same chip, the processing power as a whole is improved.

However, when the width of the data bus is increased, the number of terminals necessary for connecting the microprocessor and an external memory located outside the chip is increased for receiving and sending the data therebetween. As a result, there is a drawback that the number of pins of the package, in which the microprocessor is enclosed, is increased. In the prior microcomputer equipped with a memory on the same chip, since the first control configuration (which is the timing of the control signal or the timing of receiving and sending data) for accessing the memory within the chip by use of the microprocessor and the second control configuration for accessing an external memory located outside the chip by use of the microprocessor are not processed of the operand especially considering both control configurations, there is a drawback in that the first width of the data bus connecting the processor and the memory within the same chip has to be equal to the second width of the data bus connecting the processor and the external memory located outside the chip.

SUMMARY OF THE INVENTION

An object of the present invention is to provide a data processing system which is able to process an operand even if both data buses within a chip or outside the chip are formed in an arbitrary manner without increasing the number of terminals which are necessary for transmitting and receiving data between the two data buses, and which is able to process the operand even if the operand is located within and/or outside the memory of the chip.

Another object of the present invention is to provide a data processing apparatus which is able to process an operand even if both data buses within a chip or outside the chip are formed in an arbitrary manner without increasing the number of terminals which are necessary for transmitting and receiving data between the two data buses, and which is able to process the operand even if the operand is located within and/or outside the memory of the chip.

For attaining the above explained objects, in the data processing apparatus comprising a central processing unit for processing an operand corresponding to an instruction and a memory unit for storing the operand located in the same chip, the present invention is characterized in that, when one operand is retrieved from outside the chip, the first operand retrieving is executed; and, when one operand is retrieved from the same chip, the second retrieving is executed, and vice versa.

According to the present invention, when a retrieving means retrieves one operand which is located outside the chip, the device of the present invention accesses a memory located outside the chip; and when a retrieving means retrieves one operand which is located within the chip, the device of the present invention accesses the memory located in the same chip.

DETAILED DESCRIPTION OF THE PREFERRED EMBODIMENT

Figure 1:
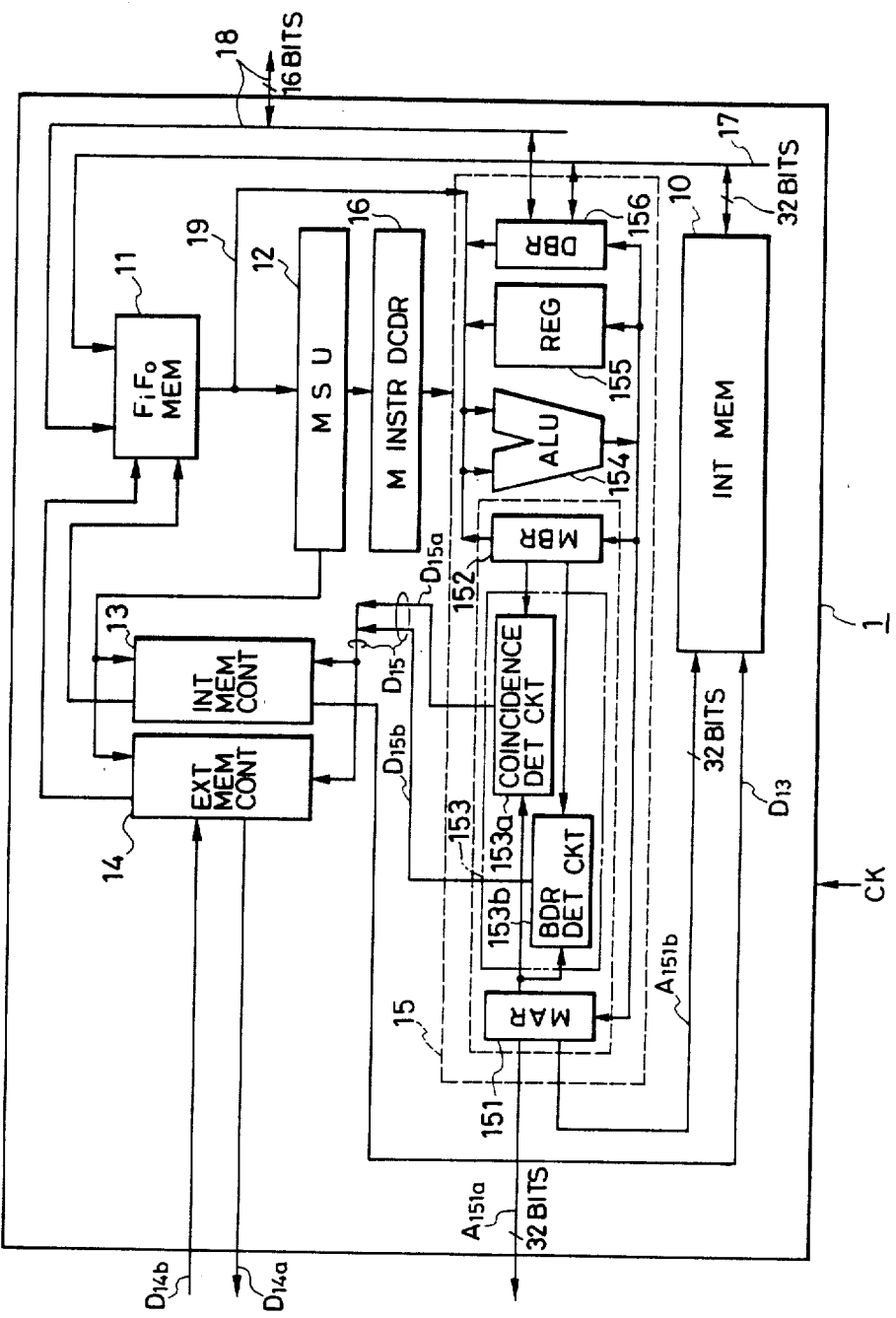
FIG. 1 is a block diagram showing one embodiment of the data processing apparatus relating to the present invention.

Referring to FIG. 1, the data processing apparatus 1 comprising an internal memory 10, a First-in First-out (FiFo) buffer memory 11, a microprogram storage unit 12, an internal memory controller 13, an external memory controller 14, a calculating unit 15, a microinstruction decoder 16, an internal data bus 17, an external data bus 18, and a bus 19 are formed on the same chip. The calculating unit 15 comprises a memory address register (MAR) 151 for registering all the memory addresses of the memory mounted on the chip together with the calculating unit 15 and another memory located outside the chip, a memory base register (MBR) 152 for storing information showing memory location in which data is stored in the internal memory 10, a comparator 153, an arithmetic and logic unit (ALU) 154, a register (RGR) 155 for storing frequently used internal data which is accessed at high speed, and a data bus register (DBR) 156 for storing the data read out of the memory located inside the same chip and the memory located outside the chip. $A_{151a}$ denotes an external address bus, and $A_{151b}$ denotes an internal address bus. The MAR 151, the MBR 152, and the comparator 153 constitute a discrimination means for discriminating the location of the operand to be used in the processing.

Hereunder, we will explain the function of the embodiment. The apparatus of the embodiment is operated in synchronism, with a clock signal CK.

A macroinstruction (a macroprogram) read out of either a memory (not shown) located outside the data processing apparatus 1 or the memory 10 located inside the data processing apparatus 1, is stored in the FiFo memory 11 temporarily. The macroinstruction stored in the FiFo memory 11 is transferred to the microprogram storage unit 12 through the bus 19 and is decoded. After the decoding, the macroinstruction is transmitted to the internal memory controller 13, the external memory controller 14, and the microinstruction decoder 16 for controlling the calculating unit 15 on the basis of a number of microinstructions (microprograms).

When the macroinstruction in the microprogram storage unit 12 calls for an operand and the operand is stored at the internal memory 10, the calculating unit 15 calculates the address of the memory location in which the operand is stored. The calculated address is stored temporarily in the MAR 151.

In the embodiment, since the address is 32 bits, the address space is 4G (giga) bytes. The comparator 153 is a unit for comparing the contents of the MAR 151 and those of the MBR 152. The output signal $D_{15a}$ from the coincidence detecting circuit 153a of the comparator 153 is a signal showing that a memory location storing the operand is in the memory 10 inside the chip. When it is discriminated that the memory location of the operand is in the memory 10 inside the chip, the signal $D_{15a}$ becomes high level (which is equal to 1 in a logical value).

For reading the operand stored in the memory, when a microinstruction (hereinafter, Mem-Read) is output from the microprogram storage unit 12, the internal memory controller 13 and the external memory controller 14 are operated according to the output signal $D_{15a}$ as follows:

(1) When the output of the signal $D_{15a}$ is at a "High" level, the internal memory controller 13 receives the starting request of the read access of the memory, and it executes the read access of the memory 10 inside the chip. At this time, the internal memory controller 13 operates to start the read access by generating the internal bus interface signal $D_{13}$ which is necessary for executing the access of the memory 10.

When the read access of the memory 10 is started, the memory 10 sends out data to the internal data bus 17 corresponding to a predetermined timing.

On the other hand, the external memory controller 14 is in a ready state at this time and waits for the starting of the next memory access.

(2) When the output of the signal $D_{15a}$ is at a "Low" level, the external memory controller 14 receives the starting request of the read access of the memory, and it operates to start the read access by generating the external bus interface signal $D_{14a}$ which is necessary for executing the access of the external memory located outside the chip. When the read access of the external memory is executed, the external memory sends out its data to the external data bus 18 corresponding to a predetermined timing.

When the external memory has to delay the sending of the operand at the predetermined timing, the external memory unit requests waiting by generating a low speed interface control signal $D_{14b}$ so that the delay of the memory access is attained.

On the other hand, the internal memory controller 13 is in a ready state at this time and waits for the starting of the next memory access at this time.

[READ ACCESS OPERATION OF THE EXTERNAL MEMORY]

Figure 2:
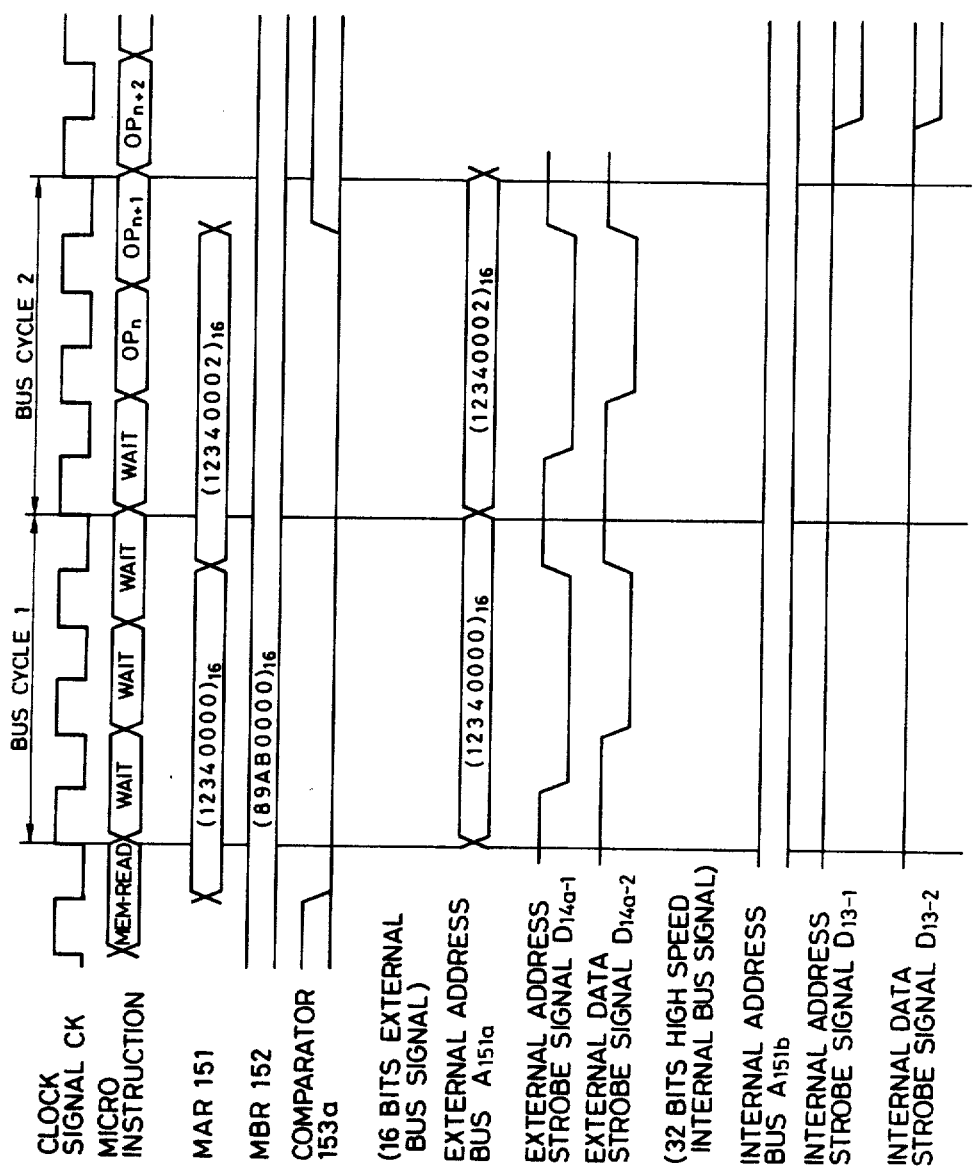
FIG. 2 is a time chart showing access timing of another memory located outside the chip.

Referring to FIG. 2, when the read access to an operand stored in the external memory located outside the chip is executed, since the external data bus 18 is 16 bits in width, the operand having 32 bits has to be transmitted on the basis of at least two memory accesses. Hereunder, we will explain the operation of transferring the operand.

(1) The address showing the stored location of a hexadecimal operand, for instance $(12340000)_{16}$, is stored in the MAR 151. At the same time, $(89AB00)_K$ of the high-order 6 digits of $(89\ AB0000)_{16}$ which is the hexadecimal content of the MBR 152, and $(123400)_{16}$ of the corresponding high-order 6 digits of the MAR 151 are compared by the comparator 153. At that time, the output $D_{15a}$ of the comparator 153 is at the "Low" level. In the above explanation, although the comparison by the comparator 153 is carried out for the high-order 6 digits of the contents stored in the MAR 151 and the MBR 152, the comparison by the comparator 153 is not limited to these high-order 6 digits, but is able to be performed in all the high-order 8 digits of the contents stored in the MAR 151 and the MBR 152.

(2) When the external memory is read by the microinstruction (Mem-Read), the MAR 151 outputs $(12340000)_{16}$ of the address to the external address bus $A_{151a}$ and the external memory controller 14 asserts the external address strobe signal $D_{14a-1}$ and the external data strobe signal $D_{14a-2}$ during the bus cycle 1 according to the timing shown in FIG. 2. The external address strobe signal $D_{14a-1}$ and the external data strobe signal $D_{14a-2}$ constitute signals of the external bus interface signal $D_{14a}$. During the bus cycle 1, a half of the data, 16 bits, of the operand of 32 bits is read into the DBR 156 of the calculating unit 15. And, for reading the data of 16 bits which corresponds to the remaining half of the operand, the bus cycle 2 is asserted in the same manner as the bus cycle 1. In FIG. 2, Opn of the microinstruction is an operation instruction for instructing a calculation after reading of the external memory located outside the chip.

[READ ACCESS OPERATION FOR THE INTERNAL MEMORY 10]

Figure 3:
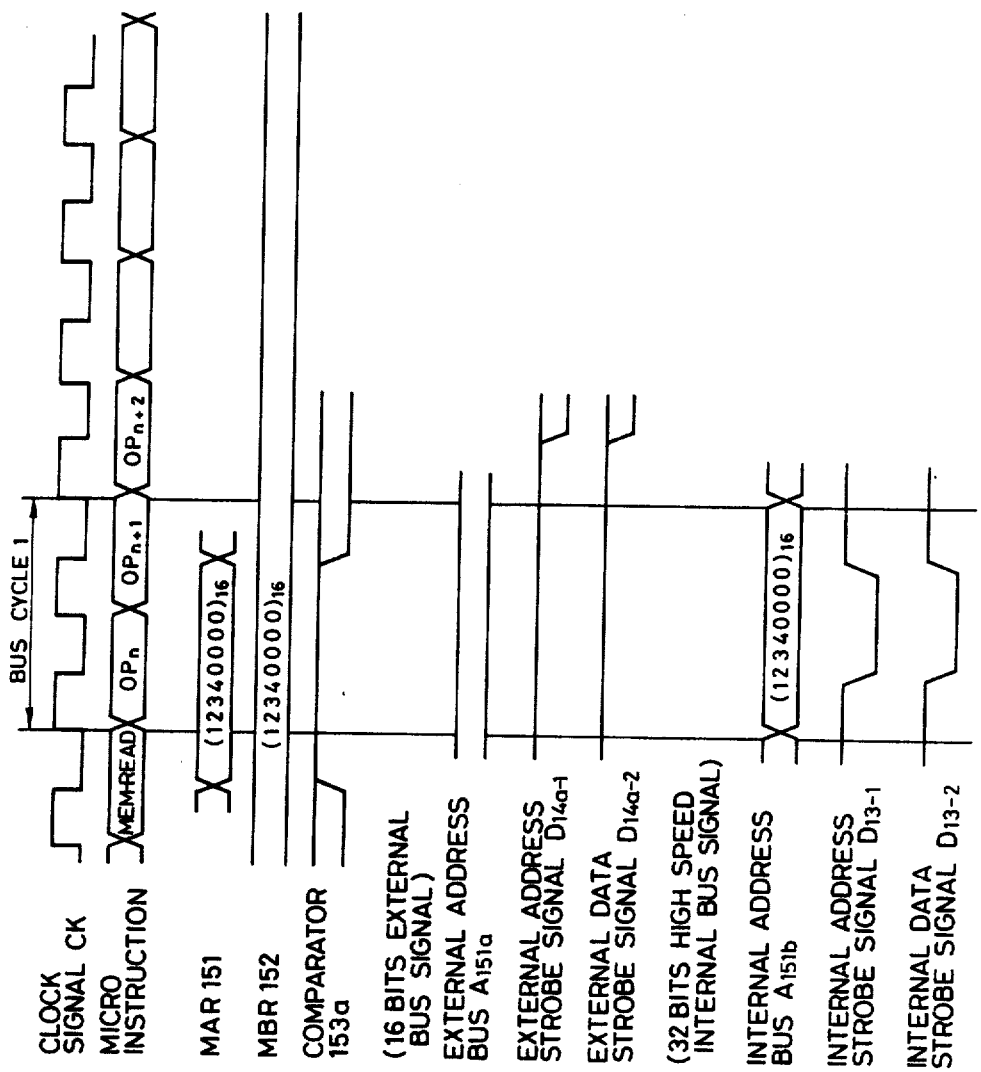
FIG. 3 is a time chart showing access timing of the memory located in the same chip.

Referring to FIG. 3, the operand stored in the internal memory 10 is read a single access time or two access times. Hereunder, we will explain the operation concerning FIG. 3.

(1) The address of $(12340000)_{16}$ showing the memory location of the operand in hexadecimal digits is stored in the MAR 151. At the same time, $(123400)_{16}$ the high-order 6 digits of $(12340000)_{16}$ which is the hexadecimal content of the MBR 152 and $(123400)_{16}$ of the corresponding high-order 6 digits of the MAR 151 are coincident with each other, so that the output $D_{15a}$ of the comparator 153 becomes "High" level.

(2) The memory is read by the microinstruction (Mem-Read), and the address $(12340000)_{16}$ is output to the internal address bus $A_{151b}$ as shown in the bus cycle 1 of FIG. 3. The internal address strobe signal $D_{13-1}$ and the internal data strobe signal $D_{13-2}$ which constitute a part of the internal bus interface signal $D_{13}$ are asserted to the internal memory 10.

By the operation explained by FIG. 3, the operand having 32 bits is read a single access time.

Figure 4:
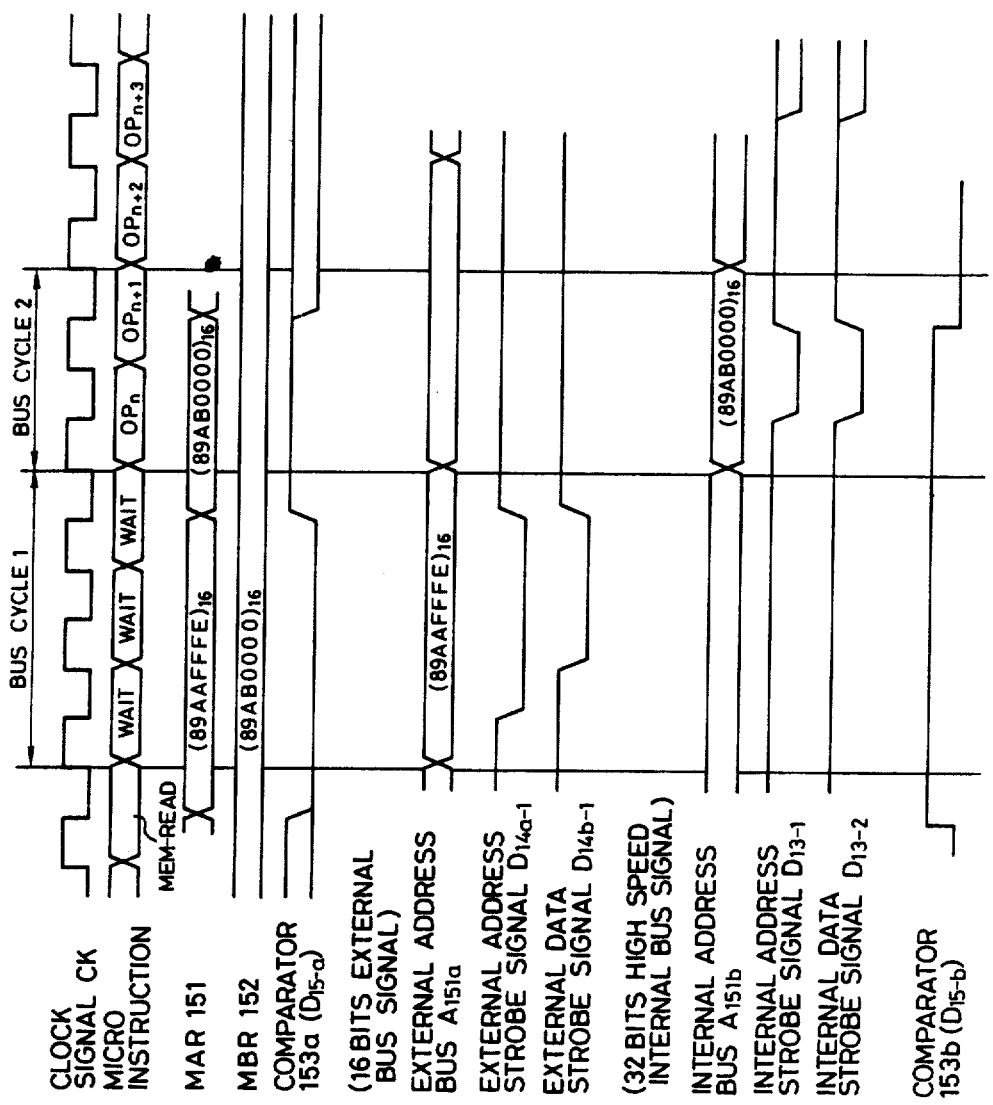
FIG. 4 is a time chart showing access timing of the another memory and the memory.

Concerning the operation when the operand is stored at both the external memory located outside the chip and the memory 10, we will explain hereunder referring to FIGS. 1 and 4.

For example, when the content stored in the MBR 152 is $(89AB0000)_{16}$, the content stored in the MAR 151 is $(89\ AAFFFE)_{16}$, and the length of the operand is 32 bits, or 4 bytes, the first 2 bytes of the operand are stored in the external memory, and the remaining 2 bytes are stored in the internal memory 10. In such a case that the operand is stored in two separate parts in the external memory and the internal memory, the embodiment of the present invention outputs a boundary signal $D_{15-b}$ from a boundary detecting circuit 153b of the comparator 153 for detecting the external memory and the internal memory, respectively, when the operand length and the subtracted value of the byte numbers stored at the MAR 151 from the byte numbers stored at the MBR 152 are shown by the following table.

| No. | Operand length | (MBR) − (MAR) |
|---|---|---|
| 1 | 2 bytes | 1 |
| 2 | 4 bytes | 1 |
| 3 | 4 bytes | 2 |
| 4 | 4 bytes | 3 |

In the case of No. 3 of example the table shown above, the operand is read according to the procedure shown by FIG. 4. Namely, one half of the operand (2 bytes) is read to the DBR 156 through the external data bus 18 in the bus cycle 1, and the other half of the operand (2 bytes) is read to the DBR 156 through the internal data bus 17 in the bus cycle 2. At this time, the DBR 156 obtains the operand of 4 bytes sequentially by reading the content read at the bus cycle 1 and the next content read at the bus cycle 2.

According to the present invention, even if the data buses located inside the chip and outside the chip are formed arbitrarily, the operand is able to be processed, since the memories of the different bus interfaces and the peripheral unit are connected easily to the data processing unit. And the present invention is able to execute high speed operand processing without increasing the number of terminals (pins of the package) which are necessary for receiving and transmitting the data, and is able to process the operand located at any location.

What we claim is:

1. A method of operating a data processing system for processing an operand corresponding to an instruction, which system includes a data processing apparatus having on the same chip an internal memory unit which stores the operand and a central processing unit for processing the operand, comprising the steps of:
   memorizing a macroinstruction read out of either an external memory unit in an apparatus located outside said chip or said internal memory unit;
   decoding said macroinstruction to produce a decoded signal;
   outputting an instruction for controlling said central processing unit based on the decoded signal;
   discriminating whether said operand is stored in said internal memory unit or in said external memory unit based on said instruction for controlling said central processing unit;
   retrieving said operand from said external memory when the result of said discriminating indicates that said operand is stored in said external memory;
   retrieving said operand from said internal memory when the result of said discriminating indicates that said operand is stored in said internal memory; and
   reading said operand to a register for performing an operation by said central processing unit after retrieving said operand from said external memory unit or said internal memory unit.

2. A method of operating a data processing system for processing an operand corresponding to an instruction which system includes a data processing apparatus having on the same chip an internal memory unit which stores the operand and a central processing unit for processing the operand, comprising the steps of:
   memorizing a macroinstruction read out of either an external memory unit located outside said chip or said internal memory unit;
   decoding said macroinstruction to produce a decoded signal;
   outputting an instruction for controlling said central processing unit based on the decoded signal;
   discriminating whether said operand is stored in said external memory unit or said internal memory unit based on said instruction for controlling said central processing unit;
   executing an operand retrieval sequentially in both said external memory unit and said internal memory unit when the result of said discriminating indicates that said operand is stored in both said external memory unit and said internal memory unit; and
   reading said operand to a register for performing an operation thereon by said central processing unit.

3. A data processing apparatus having on the same chip a central processing unit for processing an operand corresponding to an instruction and an internal memory unit, comprising:
   discriminating means for discriminating whether said operand is stored in said internal memory unit or in an external memory unit located outside said chip;
   first operand retrieving means responsive to said discriminating means for retrieving said operand from said external memory when said operand is stored in said external memory; and
   second operand retrieving means responsive to said discriminating means for retrieving said operand from said internal memory unit;
   wherein, said discriminating means includes means for operating said first operand retrieving means when said discriminating means discriminates that said operand is located outside said chip and for operating said second operand retrieving means when said discriminating means discriminates that said operand is located in said chip, the retrieved operand from said external memory unit and said internal memory unit being read to said central processing unit.

4. A data processing apparatus according to claim 3, further including boundary detecting means for detecting whether respective parts of said operand are located in said external memory unit and said internal memory unit, and means, responsive to the boundary detecting means detecting that parts of said operand are located in both said external memory unit and said internal memory unit, for operating said first operand retrieving means and said second operand retrieving means to execute the first operand retrieving by said external memory unit and the second operand retrieving by said internal memory unit sequentially for reading said operand to said central processing unit.

5. A data processing apparatus having on the same chip a central processing unit for processing an operand corresponding to an instruction and an internal memory unit, comprising:
- an instruction register for holding a macroinstruction read out of either one of an external memory unit in an apparatus located outside said chip or said internal memory unit;
- a microprogram storage unit for decoding said macroinstruction held in said instruction register;
- a microinstruction decoder for controlling said central processing unit in response to an instruction from said microprogram storage unit;
- a calculating unit comprising a discriminating circuit for discriminating a location of said operand, said discriminating circuit being formed by a memory address register for storing an address of said external memory unit outside said chip and said internal memory unit, a memory base register for storing an address of said internal memory unit, and a coincidence detecting circuit which is operative when both output signals of the memory address register and the memory base register are coincident; a data bus register for storing operand data read out of said external memory unit and said internal memory unit; and an arithmetic and logic unit;
- an external memory controller for retrieving said operand from external memory unit in response to said coincidence detecting circuit and for reading said operand from said external memory unit to said data bus register; and
- an internal memory controller for retrieving said operand from said internal memory unit in response to said coincidence detecting circuit and for reading said operand from said internal memory to said data bus register.

6. A data processing apparatus according to claim 5, further comprising a boundary detecting circuit for detecting whether respective parts of said operand are stored in said external memory unit and said internal memory separately based on output signals from said memory address register and said memory base register, add means for supplying an output signal of said boundary detecting circuit to said external memory controller and said internal memory controller for retrieving said operand from said external memory unit and said internal memory unit sequentially and for reading said operand to said data bus register.

7. A data processing apparatus according to claim 5, said instruction register comprises a First-in First-out buffer memory.

8. A data processing apparatus according to claim 5, said calculating unit has a register for storing at high speed data which is frequently used.

* * * * *